Aug. 12, 1941.  W. W. SHIPLEY  2,252,443
SILVER SOLDER COATING FOR SOLDERING IRONS
Filed April 23, 1937
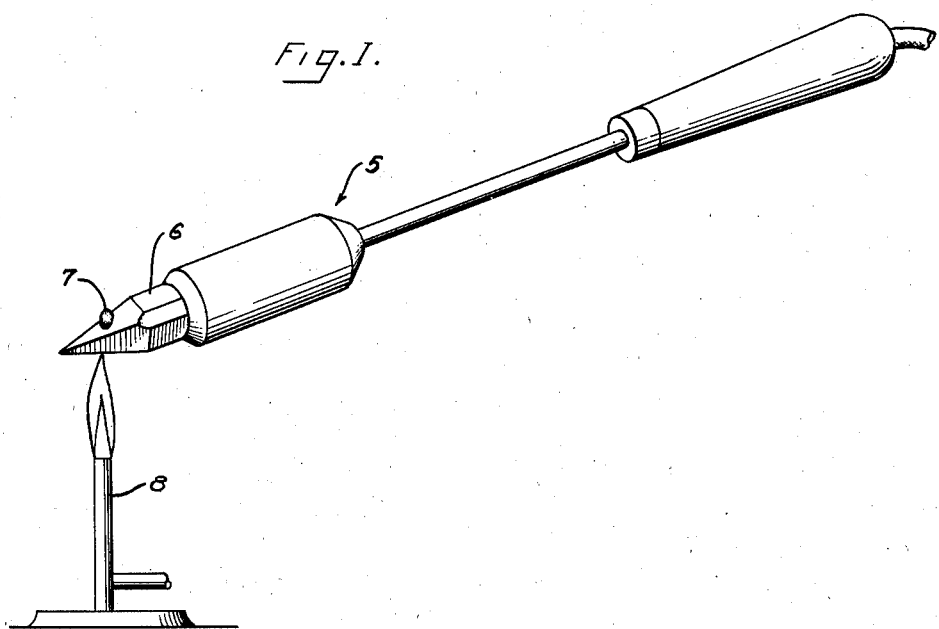
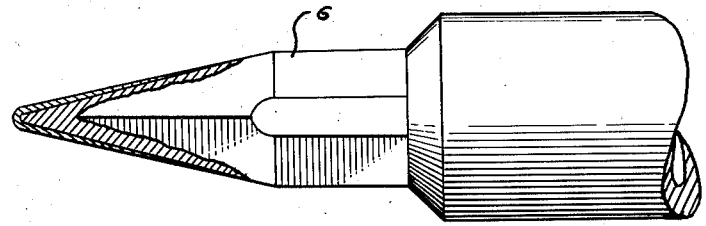
INVENTOR
W. W. SHIPLEY
BY
ATTORNEY Patented Aug. 12, 1941

2,252,443

UNITED STATES PATENT OFFICE 2,252,443

SILVER SOLDER COATING FOR SOLDERING IRONS

Wallace W. Shipley, Baltimore, Md., assignor to Western Electric Company, Incorporated, New York, N. Y., a corporation of New York Application April 23, 1937, Serial No. 138,592

2 Claims. (Cl. 91—70.2)

This invention relates to a method of coating a soldering iron tip.

In order to cause the solder to flow freely from the tip of a soldering iron onto the work to be soldered, it has been the practice in many instances to coat the tip, which is usually made of copper on account of its heat conducting properties, with a thin film of solder. This is usually referred to as "tinning" the soldering iron. Through usage, overheating and many other factors this film is impaired and soldering irons in constant use require frequent retinning.

An object of the present invention is to provide a simple and efficient method of applying an effective coating for a soldering iron tip.

In accordance with one embodiment of the invention a coating of a composition known as silver solder is applied to the tip of the soldering iron.

A complete understanding of the invention may be had by reference to the following description taken in conjunction with the accompanying drawing, in which Fig. 1 is a perspective view of a soldering iron in the process of having a silver solder coating applied, and Fig. 2 is a fragmentary view, partly in section, illustrating a tip coated in accordance with the invention.

Referring now more in detail to the drawing, a soldering iron 5 is shown having a tip 6 to be coated. The core or body of this tip is usually made of copper on account of its good heat conducting qualities but may be made of other suitable materials. In applying a silver solder coating to the tip, the tip is first tinned with any suitable soldering material in accordance with methods well known in the art. A small piece of silver solder 7, which has previously also been tinned, is then placed upon the tip. In this manner the tip and the piece of silver solder are prevented from oxidizing during the following step in which the tip is heated to a temperature at which the silver solder fuses and spreads over the tip. The tip may be heated for this purpose in the flame of a Bunsen burner 8 or by any other suitable means. Oxidation may also be prevented by heating in a non-oxidizing or reducing atmosphere.

Various compositions of silver solder on the market are suitable for the purposes of this invention. One specific type of composition that has been used with considerable success is an alloy comprising substantially 45% of silver, 30% of copper, and the balance zinc. This example is given merely by way of illustration, since any silver solder alloy may be used.

It has been found that tips of soldering irons coated in accordance with this invention may be heated to extremely high temperatures without impairing the coating, and a peculiar phenomenon has been noticed, that the tip may wear away underneath the coating without destroying the coating itself. While it is not desired to be limited to any particular theory, it appears that the original lead tin coating or tinning disappears either during the fusion process or later and that the copper and zinc also substantially disappear, leaving a silver coating which is probably amalgamated with the material of the tip.

It will be understood that the nature and embodiment of the invention herein described is merely illustrative and that many changes and modifications may be made therein without departing from the spirit and scope of the invention.

What is claimed is:

1. A method of coating a soldering iron tip which comprises coating the tip with a material to prevent oxidation, coating a quantity of silver solder with a material to prevent oxidation, and heating the iron and silver solder until the silver solder melts and flows over the tip to form a coating capable of withstanding high temperatures without impairment.

2. A method of coating a soldering iron tip which comprises coating the tip with a lead-tin alloy, tinning a quantity of silver solder with a lead tin alloy, and heating the iron and solder until the solder melts and flows over the surface of the tip.

WALLACE W. SHIPLEY.